BURST SEPARATOR FOR COLOR TELEVISION RECEIVERS

Filed Nov. 1, 1956 3 Sheets-Sheet 1

INVENTOR.
Louis F. Schaefer
BY
Oliver C. Mitchell
ATTORNEY

Sept. 6, 1960 L. F. SCHAEFER 2,951,896
BURST SEPARATOR FOR COLOR TELEVISION RECEIVERS
Filed Nov. 1, 1956 3 Sheets-Sheet 2

INVENTOR.
Louis F. Schaefer
BY
[signature]
ATTORNEY

BURST SEPARATOR FOR COLOR TELEVISION RECEIVERS

Filed Nov. 1, 1956 3 Sheets-Sheet 3

INVENTOR.
Louis F. Schaefer
BY
[signature]
ATTORNEY

United States Patent Office 2,951,896

Patented Sept. 6, 1960

2,951,896

BURST SEPARATOR FOR COLOR TELEVISION RECEIVERS

Louis F. Schaefer, Lynbrook, N.Y., assignor to Radio Corporation of America, a corporation of Delaware Filed Nov. 1, 1956, Ser. No. 619,885

6 Claims. (Cl. 178—5.4)

This invention relates to color television receivers, and more particularly to means for separating color subcarrier bursts from a chrominance and burst signal in such a way as to prevent the feeding back of local color subcarrier oscillations from the color demodulators to the burst channel.

The color television standards adapted in the United States by the Federal Communications Commission on December 17, 1953, provide that the color video signal include, during trace time, a luminance portion having frequency components from zero to 4.1 megacycles, and a chrominance or chroma portion having frequency components from about 2.5 megacycles to 4.1 megacycles, and, during retrace time, a synchronizing pulse having a back porch modulated by a burst of at least 8 cycles of a color subcarrier frequency of 3.58 megacycles.

In a color television receiver, the chroma signal and the bursts are normally amplified together in a chroma and burst amplifier having an output coupled to synchronous color demodulators. During retrace time, a burst separator is actuated by a fly back pulse to couple the burst output of the chroma and burst amplifier through a burst channel to a burst-controlled color-subcarrier continuous-wave oscillator. The synchronized oscillations also are applied to the color demodulators. The outputs of the demodulators are matrixed to produce three color difference signals for application to a color picture reproducing device such as a shadow mask kinescope.

During bursts, when the output of the chroma and burst amplifier is coupled by means of a burst separator to the burst channel, some degree of coupling remains between the output of the chroma and burst amplifier and the demodulators. Therefore, during bursts it is possible for local color subcarrier oscillations in the demodulators to be fed back from the demodulators to the burst channel. This feedback of local oscillations into the burst channel interferes with the proper functioning of the synchronizing circuits.

The feeding back of color subcarrier oscillations from the color demodulators to the burst channel is known as demodulator feed-through. Demodulator feed-through can be prevented by employing an additional amplifier stage between the point at which the burst is taken off and the color demodulators. This arrangement provides an isolating stage but has the disadvantage that the bursts are amplified to a lesser extent than the chrominance signal. Sufficient amplification of the burst signal is necessary for the creation of an acceptable color picture. It is also possible to avoid demodulator feed-through by employing a balanced arrangement wherein out of phase outputs from the color subcarrier oscillator are applied to each of the demodulators. With this arrangement, the oscillations cancel in the demodulator and are not fed back to the burst channel. A still further arrangement preventing demodulator feed-through is one wherein pentagrid tubes are used in the demodulator circuits with the chroma and local oscillations applied to different grids having a shielding grid therebetween. This latter arrangement does not provide enough output to drive the kinescope and therefore matrix amplifiers are required.

It is an object of this invention to provide an improved burst separating arrangement which prevents demodulator feed-through, which is relatively inexpensive to construct, and which is relatively uncritical in adjustment.

It is another object to provide an improved coupling arrangement for use between a chroma and burst amplifier and synchronous color demodulators to also perform the functions of burst separation.

It is a further object to provide an improved chroma and burst amplifier having a burst separating output circuit which prevents the feeding back of local color subcarrier oscillations from the demodulators to the burst take-off point.

It is a still further object of this invention to provide an improved burst separating arrangement capable of use in a color television receiver system involving high level unbalanced demodulation, that is, a system wherein the amplitude of the chroma and burst signal at the output of the common amplifier is high enough so that the bursts can operate the phase detector and the output of the demodulators can drive the kinescope.

According to the invention, the chroma and burst signal is applied to a circuit having a chroma output channel and a burst output channel. During trace time, the chroma signal is directed to the chroma output channel. During retrace time, the chroma output channel is substantially short circuited thus preventing demodulator feed-through. The short circuiting of the chroma output channel causes impedance changes which direct the bursts to the burst output channel.

A color television receiver arrangement according to the invention may comprise a chroma and burst amplifier having a burst separating output circuit including first and second inductors coupled in series from the anode of the amplifier tube to a chroma output which is coupled during trace to the input of the synchronous color demodulators. A diode and a source of flyback pulses are connected across the chroma output to permit the taking off of bursts, during retrace, from the junction between the two inductors. The first inductor and the shunt capacitance at the anode of the amplifier are tuned to be series resonant at the burst frequency to present a very low impedance which prevents the feeding back of local color subcarrier oscillations from the demodulators to the burst take-off point. The second inductor and associated shunt capacitance are tuned so that, during trace, the entire circuit has the desired frequency response for the chroma signal.

In order that the invention may be fully applied and the advantages thereof readily obtained in practice, special embodiments of the invention are described hereinafter with reference to the accompanying drawings in which.

Figure 1:
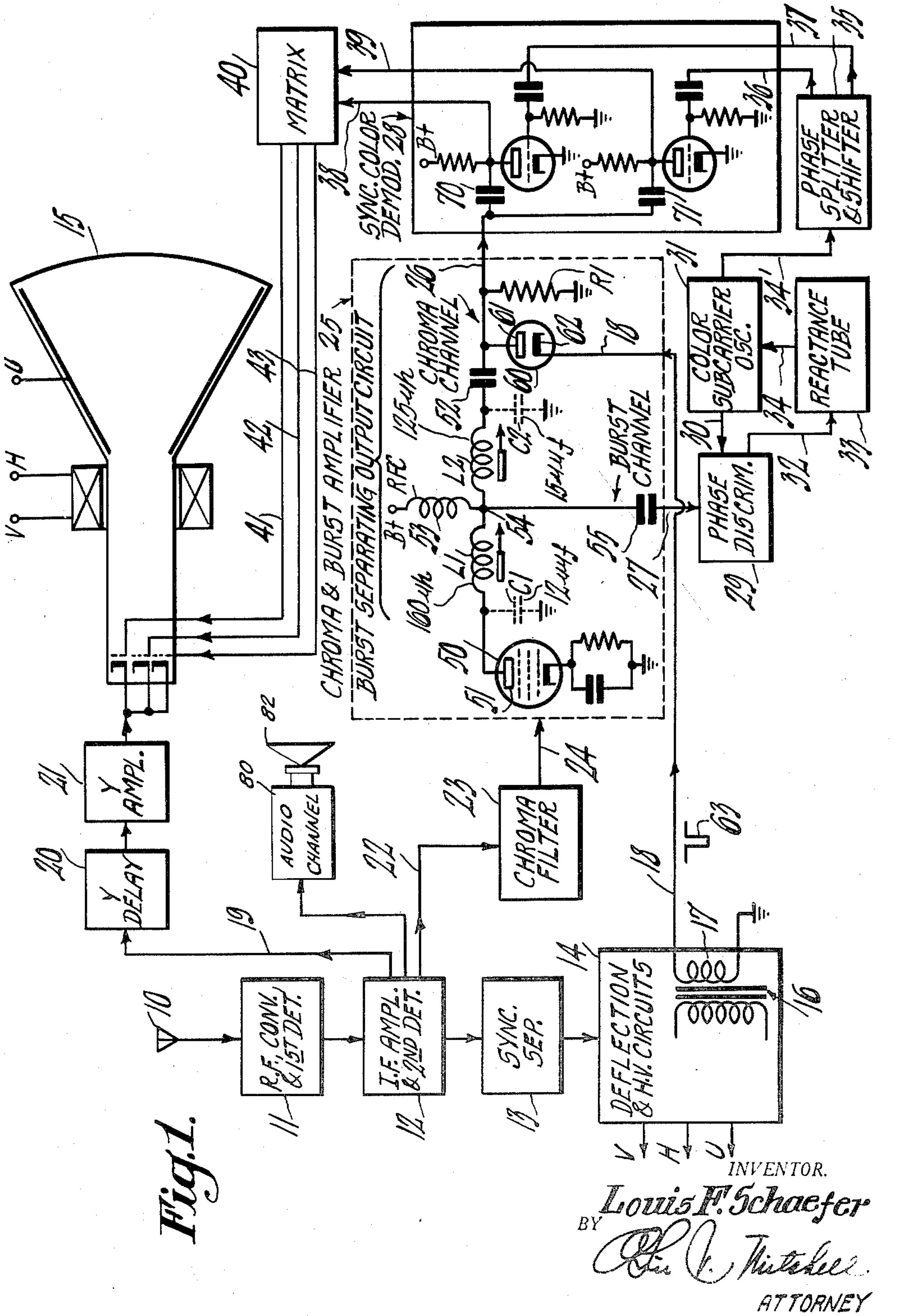
Figure 1 is a diagram of a color television receiver incorporating a chroma and burst amplifier having a burst separating output circuit constructed according to the teachings of this invention.

Figure 1 shows a color television receiver incorporating the present invention. A color television signal received by antenna 10 is applied through a circuit 11 including a radio frequency amplifier, a converter, and a first detector to a circuit 12 including an intermediate frequency amplifier and a second detector. One video output of the circuit 12 is applied through a synchronizing pulse separator 13 to deflection and high voltage circuits 14. The circuits 14 have vertical deflection, horizontal deflection, and ultor voltage outputs designated V, H, and U, which are connected to similarly designated terminals of a color kinescope 15. The deflection and high voltage circuits 14 include a high voltage transformer 16 having a secondary coil 17. One end of the secondary coil 17 is connected to ground, and the other end is connected to a lead 18 on which there is provided a negative fly-back pulse which coincides in time with the color subcarrier bursts on the back porch immediately following each horizontal synchronizing pulse of the received video color television signal.

Another output from the second detector in the circuit 12 is applied through an audio channel 80 to a loudspeaker 82 to reproduce the audio portion of the television signal. A third output 19 from the second detector in the circuit 12 provides the luminance portion of the color television signal and is applied through a Y delay 20 and a Y amplifier 21 to electrodes of the color kinescope 15.

A fourth output 22 from the second detector in the circuit 12 is applied through a chroma filter 23 having an output including frequency components between about 3 megacycles and 4 megacycles. The output of the chroma filter 23 thus includes the chrominance or chroma portion of the color signal and also the color subcarrier bursts having a frequency of about 3.58 megacycles. The chroma and bursts from the filter 23 are applied by a lead 24 to a chroma and burst amplifier 25 having a chroma output lead 26 and a burst output lead 27.

Figure 5:
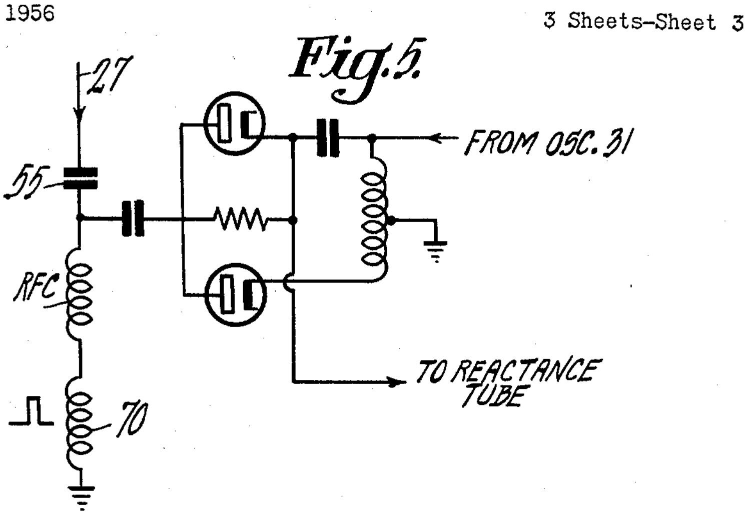
Figure 5 is a circuit diagram of a phase discriminator which may be employed in the box 29 of Figure 1.

The chroma output on lead 26 from the amplifier 25 is applied to the chroma input of a synchronous color demodulator 28. The burst output on lead 27 from the amplifier 25 is applied to a phase discriminator 29. An output 30 from a local color subcarrier oscillator 31 is applied to the phase discriminator 29. The phase discriminator 29 compares the local oscillations with the received bursts and corrects the frequency and phase of the local oscillator 31 by means of a control voltage applied over lead 32 to a reactance tube 33 which is in turn coupled by lead 34 to the oscillator 31. The phase discriminator 29 may be a gated phase discriminator as shown in Figure 5 and described in patent application Serial No. 522,443, filed July 18, 1955, by Albert Macovski, now Patent No. 2,883,452, granted April 21, 1959, and entitled, "Balanced Phase Detecting Circuits." The gated phase discriminator or detector of Figure 5 includes a secondary coil 70 on the high voltage transformer 16 in the deflection and high voltage circuits 14 of Figure 1. On the other hand, the phase discriminator 29 may be an ungated phase discriminator as shown on page 308 of the March 1956 issue of the Proceedings of the IRE.

The burst-synchronized local color-subcarrier oscillations from the oscillator 31 on lead 34' are applied through a phase splitter and shifter 35 to the reference oscillation inputs 36 and 37 of the synchronous color demodulator 28. The demodulator 28 provides two demodulated signal outputs on leads 38 and 39 which are applied to a matrix 40. The output of the matrix 40 consists of three color difference signals on leads 41, 42 and 43 which are applied to electrodes of the red, blue, and green color controlling guns in the color kinescope 15.

The foregoing description sets forth a typical color television receiver arrangement wherein the chroma and burst amplifier 25 of this invention may advantageously be used. It will be understood that other types of demodulators 28, and other types of burst-controlled color subcarrier oscillation generators 29, 31, 33, and other types of color picture reproducing devices 15 may be employed.

Reference will now be made to the chroma and burst amplifier 25 shown in the dotted line box. The chroma and burst signal from the filter 23 is applied to the control electrode of an amplifying vacuum tube 50. It will be understood that additional amplifying stages (not shown) may be inserted between the chroma filter 23 and the vacuum tube 50. The anode 51 of the vacuum tube 50 is coupled through impedance means including a first inductor L1 and a second inductor L2, arranged in series, to the chroma signal output lead or channel 26. Capacitor 52 is a direct current blocking capacitor. B+ potential for the anode 51 of tube 50 is applied from a B+ terminal through a radio frequency choke 53 to the junction point 54 between the inductors L1 and L2. It will be understood that there are other known methods of applying B+ potential to the anode 51 of the tube 50, and that these other methods may involve a different location for the radio frequency choke 53 and the blocking capacitor 52, such as will be described in connection with Figure 6.

The burst output lead 27 is coupled through a blocking capacitor 55 to the burst take-off point 54 at the junction between the inductors L1 and L2. A loading or broadbanding resistor R1 is connected from the chroma output lead 26 to ground or other point of reference potential. The resistor R1 reduces the Q of the output circuit, during trace, to provide the desired broad frequency response characteristic for the chroma signal having frequency components between about 3 and 4 megacycles.

A discharge device or diode 60 has an anode 61 coupled to the chroma output or chroma channel 26, and has a cathode 62 connected by lead 18 to the secondary coil 17 of the high voltage transformer 16 in the circuits 14. When a burst is present in the amplifier 25, a negative pulse 63 is applied over lead 18 to the cathode 62 of the diode 60. This renders the diode 60 conductive and provides a very low impedance path from the chroma channel 26 to ground which substantially short circuits the chroma channel during bursts.

A dotted line capacitor C1 is shown in shunt with the output from the anode 51 vacuum tube 50. The capacitor C1 may represent the output capacitance of the vacuum tube 50 together with the other distributed capacitance of the wiring. On the other hand, the capacitor C1 may represent the distributed capacitances in combination with a lumped capacitive element. Similarly, the capacitor C2 presents the distributed shunt capacitance at the chroma output 26, or, the distributed capacitance in combination with a lumped capacitive element.

The values of the inductor L1 and the capacitor C1 are selected to provide series resonance between the junction point 54 and ground at the frequency of the bursts, namely 3.58 megacycles. This is most easily accomplished by tuning the inductor L1 to series resonance with the distributed capacitance C1. It will be understood that the inductor L1 may be fixed in value and the capacitor C1 may be adjustable to provide the desired series resonance. The inductor L2 is next adjusted to provide parallel resonance in the circuit including C1, C2 and L1. Inductor L2 is adjusted to provide resonance at some frequency in the range occupied by the chroma signal. The output circuit of vacuum tube 50 is normally one of a plurality of stagger-tuned circuits which together provide the desired frequency response characteristics for the chroma signal. Of course, the inductor L2 may be fixed in value and the capacitor C2 may be adjustable. One or the other of the elements C2 and L2 should be adjustable; and one or the other of the elements C1 and L1 should be adjustable.

In the operation of the chroma and burst amplifier 25, there are two conditions. During trace time, a chroma signal is present in the amplifier 25 and is coupled to the demodulator 28. During retrace time, a burst is present in the amplifier 25, and a negative pulse 63 is applied to the cathode 62 of the diode 60 to cause the diode to substantially short circuit the chroma output lead 26. This causes the burst to be developed at the junction point 54 and be applied over lead 27 to the phase discriminator 29. The operation of the burst separating output circuit can be more clearly explained by reference to Figures 2 through 4 illustrating the effective circuit configurations under different conditions.

Figure 2:
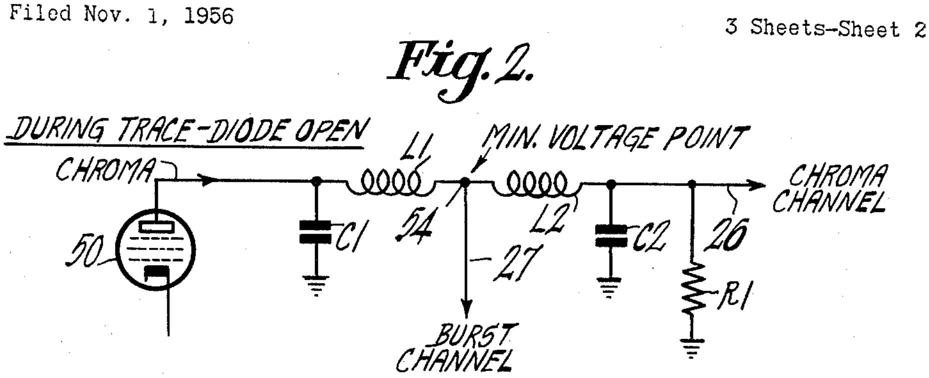
Figure 2 is a circuit diagram which will be referred to in describing the operation of the invention during trace time.

Figure 2 illustrates the condition existing during trace time, that is, when a chroma signal is applied to the circuit, and the diode 60 is not conducting. The inductors L1 and L2 and the capacitor C1 and C2 constitute a $\pi$ network tuned to efficiently couple the chroma signal from the vacuum tube 50 to the chroma output lead 26. The junction point 54 between the inductors L1 and L2 is a minimum or substantially minimum voltage point. If L1 and L2 have equal values, and C1 and C2 have equal values, the junction point 54 is a point of minimum radio frequency voltage. Since the junction point 54 is a point of minimum voltage, there is very little coupling of the chroma signal to the burst channel 27. The burst channel is thus isolated from the chroma signal.

The amount of chroma present in the burst channel 27 depends on the Q of the output circuit of the chroma amplifier tube 50, and this depends primarily on the value of the load resistor R1. The higher the value of resistor R1, the higher the Q, and the lower the amplitude of chroma signal during trace at the minimum voltage point 54. If a high value resistor R1 is employed, the chroma signal at point 54 will be small enough so that the point 54 can be coupled directly to a conventional ungated phase discriminator 29. It may be necessary to provide a double peaked frequency response circuit somewhere in the preceding part of the chroma amplifier so that the desired over-all broadband frequency characteristic will be obtained. If design considerations require a relatively low value resistor R1, it may be desirable to gate the burst signal at the point 54 before application to the phase discriminator 29, or to employ a separately gated phase discriminator as shown in Figure 5, or to employ the circuit arrangement of Figure 6.

Figures 3, 4:
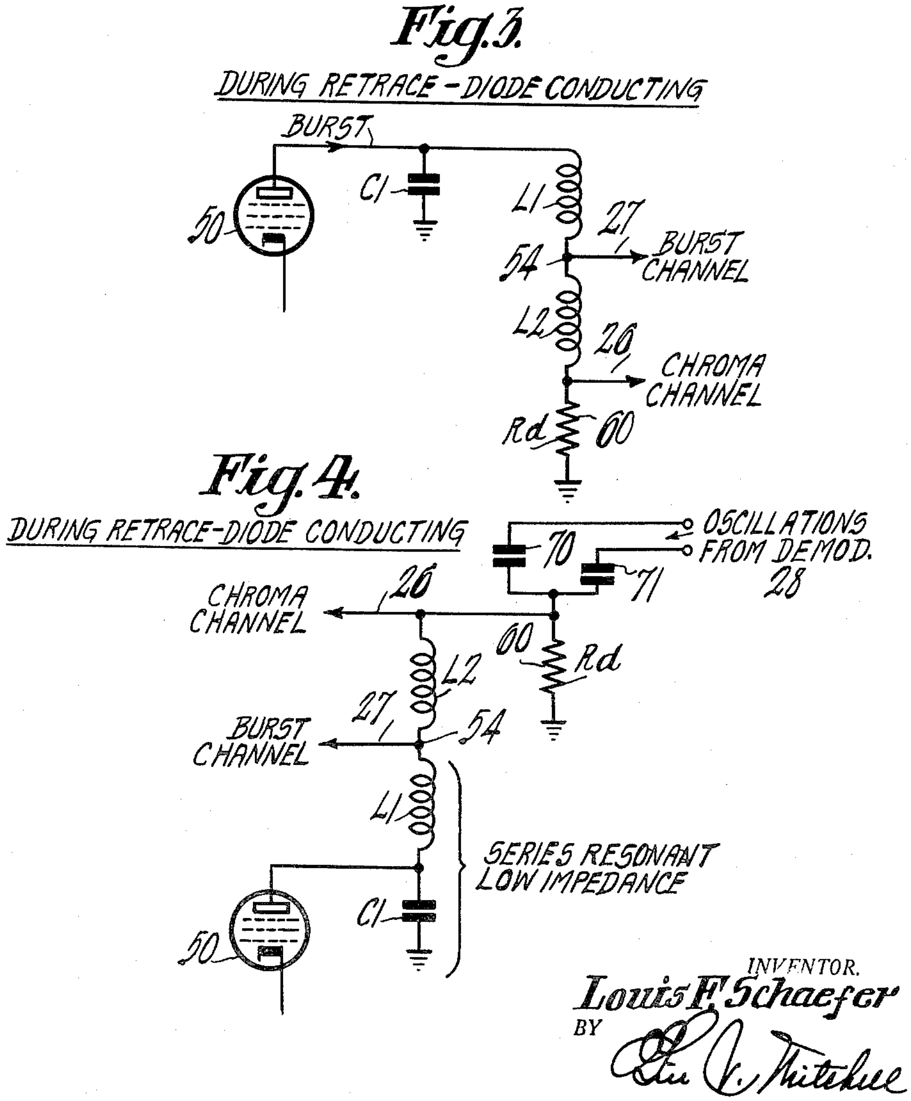
Figure 3 is another circuit diagram which will be referred to in describing the operation of the invention during retrace time.
Figure 4 is a rearranged version of the circuit of Figure 3 which will be referred to in describing the manner in which the demodulator feed-through is prevented.

Figure 3 shows the effective circuit arrangement during retrace when the diode 60 is rendered conductive by the flyback pulse 63 applied to its cathode 62. When the diode 60 is conductive, it presents a very small internal resistance. If the diode 60 is a vacuum tube diode, the internal resistance in the forward direction is about 200 ohms, and if the diode is a crystal diode, the internal resistance of the diode 60 in the forward direction is about 50 ohms. The internal resistance of the diode 60 in the forward direction is represented in Figure 3 by the resistor R*d*. During retrace, the burst present at the output of the tube 50 is applied across C1 in parallel with L1, L2 and R*d*. The impedance of R*d* is so small compared with the impedance of L1 and L2 that substantially no burst signal appears at the chroma output lead 26. On the other hand, the burst signal does appear at the junction point 54 and the burst output lead 27. The capacitor C2 is effectively shorted by the resistance R*d* of the conducting diode 60. The effective grounding of the chroma output lead 26 unbalances the parallel resonant circuit previously including capacitor C2 along with capacitor C1, inductor L1 and inductor L2, and the junction point 54 between the inductors is no longer a minimum voltage point. Therefore, the burst signal is developed at the junction point 54 and is applied to the burst channel 27. While the burst signal at junction point 54 is reduced in amplitude by the voltage dividing action of inductances L1 and L2, the impedance relationships are such as to provide an effective transfer of burst energy from the amplifier tube 50 to the phase discriminator 29. Although the plate load of 50 is reactive at this time, this impedance is still moderately high hence yielding significant gain for burst.

Figure 4 also represents the burst separating output circuit which is effective during retrace when the diode 60 is conducting. The circuit of Figure 4 is similar to that of Figure 3 but is rearranged to illustrate why local color subcarrier oscillations present in the demodulator 28 cannot be fed or coupled back to the burst channel 27. It will be clear that if local oscillations are permitted to reach the burst channel and the phase discriminator 29, the operation of the circuits by which the local oscillations are synchronized with the bursts will be very adversely affected. The feeding back of local oscillations, usually called demodulator feed-through, is prevented in a manner which is apparent from Figure 4. Going from left to right in the circuit of Figure 4, the oscillations from the demodulator 28 are reduced at the chroma lead 26 by reason of the voltage divider action of demodulator capacitance 70 and 71, and the very low forward resistance R*d* of the diode 60. The oscillations on the chroma lead 26 are still further reduced by application to the series combinations of L2, L1, and C1. As previously pointed out, the inductor L1 and the capacitor C1 are tuned, or have values selected, to provide series resonance at the subcarrier frequency between the point 54 and ground. Therefore, there is a very low impedance between the junction point 54 and ground. The reduced value of oscillations present on the chroma lead 26 are very greatly reduced or eliminated in the burst output 27 by the voltage divider action of the relatively high impedance L2 in series with the very low impedance of the series resonant circuit including L1 and C1. It is thus apparent that when the diode 60 is conducting, it is impossible for oscillations in the demodulator to be coupled back to the burst channel 27.

Figure 1 shows values for the inductors L1 and L2, and the capacitors C1 and C2 which are given by way of example as values which have worked very satisfactorily in actual practice. The value of inductor L1 for use with distributed capacitance C1 is conveniently determined by varying the value of L1, in the absence of chroma and burst signals in the amplifier 25, and with a potential applied to the cathode 62 of the diode 60 to maintain it conductive, while observing amplitude of the local oscillations fed from the demodulator 28 to the junction point 54. The inductor L1 is adjusted to provide a minimum amplitude of oscillations at point 54. The value which the inductor L2 may have in no way interferes with the tuning of the inductor L1. After L1 is tuned to series resonance with capacitor C1, the inductor L2 is tuned with the aid of a sweep generator and an oscilloscope. The output of the sweep generator is applied through the chroma and burst amplifier 25, the oscilloscope is coupled to the chroma output 26 of the amplifier 25, and the inductor L2 is varied until the desired frequency response characteristic for the chroma signal is obtained.

Figure 6:
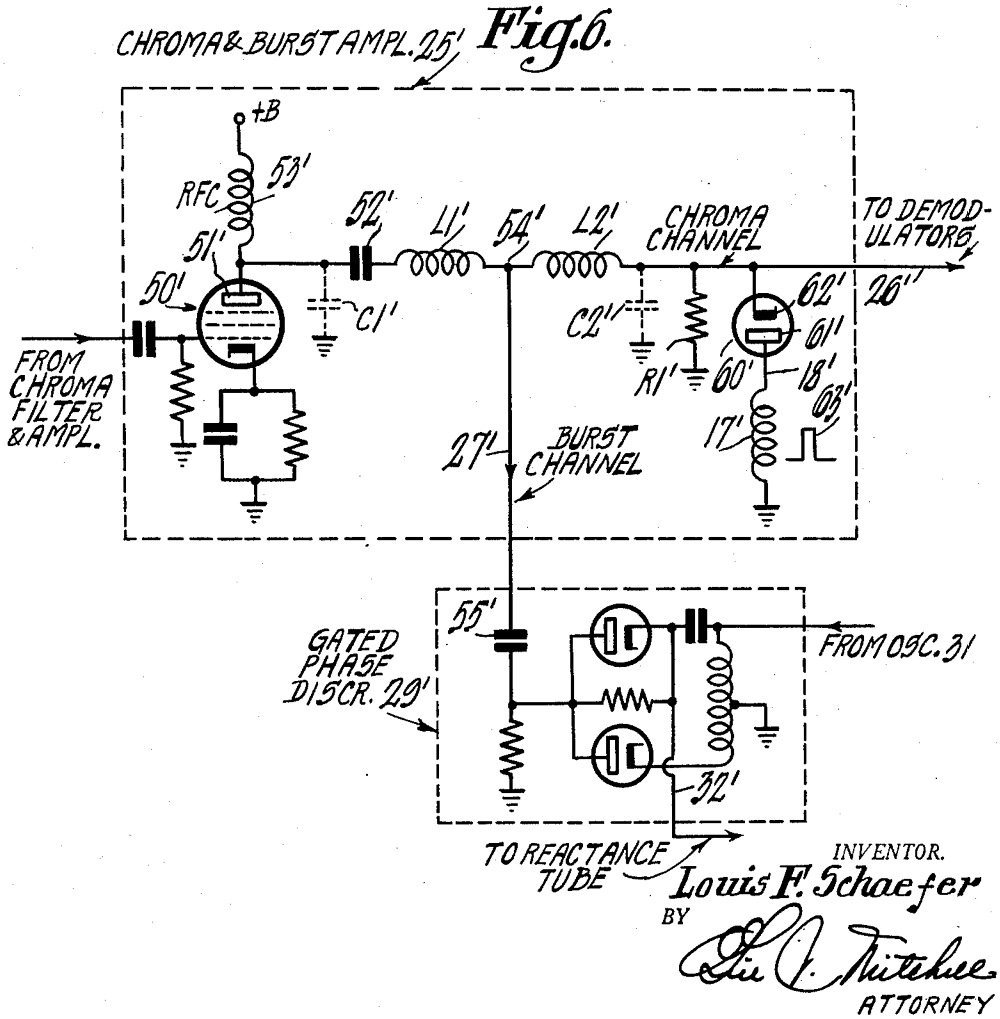
Figure 6 is a modified form of chroma and burst amplifier which may be substituted in the system of Figure 1.

Figure 6 shows a chroma and burst amplifier 25′ which differs from the corresponding amplifier 25 in Figure 1 in that B+ is applied through choke 53′ directly to the anode or plate 51′ of the vacuum tube 50′, the blocking capacitor 52′ is shifted to the opposite end of the output circuit, and the diode 60′ is reversed in polarity. Circuit elements in Figure 6 corresponding to elements in Figure 1 have the same numerals with prime designations added. Figure 6 also includes a gated phase discriminator 29′. The circuit arrangement of Figure 6 positively prevents chroma signal from entering and disturbing the operation of the phase discriminator. The positive flyback pulse 63′ developed across the secondary coil 17′ renders the diode 60′ conductive during each burst. In addition, the major portion of the positive pulse 63′ appears at the burst take-off point 54′ and provides a pedestal upon which the burst is placed. The exhaulted burst applied over burst channel lead 27′ to the phase discriminator 29' insures that the phase discriminator will not respond to the lower level chroma present at point 54' during trace time. Therefore, the pulse 63' applied to the diode 60' serves to switch the output of the chroma and burst amplifier between the chroma channel 26' and the burst channel 27', and it also gates the gated phase discriminator 29'. In other respects the operation of the arrangement of Figure 6 is similar to that described in connection with Figure 1.

It is apparent that according to this invention there is provided a chroma and burst amplifier having a burst separating output circuit so constructed as to switch the output of the amplifier from the chroma channel to the burst channel upon receipt of a flyback pulse. The amplifier is so constructed that local color subcarrier oscillations present in the color demodulators cannot be fed back into the burst channel. It is therefore unnecessary to be restricted to the use of synchronous color demodulators of the types wherein the local oscillations are phased to cancel in the feed back path, or which employ pentagrid tubes with shield electrodes between the electrodes to which the oscillations and the chroma are applied.

What is claimed is:

1. In a color television receiver, a chroma and burst amplifier having a burst separating output circuit, comprising, an amplifier device having an output electrode, a chrome output terminal, a first inductor and a second inductor serially coupled between said output electrode and said chroma output terminal, a burst output terminal connected to the junction between said inductors, capacitance means connected between said output electrode and a point of reference potential for said receiver, said first inductor having a value to provide with said capacitance means a series resonant circuit at the frequency of said burst between said burst output terminal and said point of reference potential, and means to substantially short circuit said chroma output terminal to said point of reference potential during the time of occurrence of said bursts.

2. In a color television receiver, a chroma and burst amplifier having a burst separating output circuit, comprising, a chroma and burst amplifier device having an output electrode and a capacitance between a point of reference potential and said output electrode, a chroma output terminal, a first inductor and a second inductor serially coupled between said output electrode and said chroma output terminal, a burst output terminal connected to the junction of said inductors, said first inductor having a value to provide series resonance with said capacitance at the frequency of said bursts, and means to substantially short circuit said chroma output terminal to said point of reference potential during the time of occurrence of said bursts.

3. In a color television receiver, means for coupling a chroma and burst amplifier to a chroma channel during trace and to a burst channel during retrace, comprising, capacitance means connected between said chroma and burst amplifier and a point of reference potential for said receiver, a first inductor and a second inductor coupled in series between said chroma and burst amplifier and said chroma channel, said first inductor having a value providing a series resonant circuit with said capacitance means at the frequency of said bursts between the junction of said inductors and said point of reference potential, said second inductor having a value which in combination with said first inductor provides the desired frequency response characteristic for the chroma signal, coupling means connected between the junction of said inductors and said burst channel, and a diode and a pulse source coupled in series across said chroma channel, said pulse source providing a pulse to render said diode conducting during retrace.

4. In a color television receiver, means for coupling a chroma and burst amplifier to a chroma channel during trace and to a burst channel during retrace, comprising, a first inductor and a second inductor coupled in series from between said chroma and burst amplifier and said chroma channel, first capacitance means between said chroma and burst amplifier and a point of reference potential for said receiver, said first inductor and said first capacitance means having values to provide series resonance at the frequency of said bursts, second capacitance means between said chroma channel and said point of reference potential, said second capacitance inductor and said second means having values which in combination with said first inductor and first capacitance means provide the desired frequency response characteristic for the chroma signal, coupling means between the junction of said inductors and said burst channel, and a diode and a pulse source coupled in series across said chroma channel, said pulse source providing a pulse to render said diode conducting during retrace.

5. In a color television receiver, means for coupling a chroma and burst amplifier to a chroma channel during trace and to a burst channel during retrace, comprising, a first inductor and a second inductor coupled in series between the chroma and burst amplifier and the chroma channel, first capacitance means connected between said chroma and burst channel and a point of reference potential for said receiver, said first inductor and said first capacitance means having values to provide series resonance at the frequency of said bursts, second capacitance means connected between said chroma channel and said point of reference potential, said second inductor and said second capacitance means having values which in combination with said first inductor and first means provide the desired frequency response characteristic for the chroma signal, the capacitance provided by said first and second capacitance means being distributed capacitances of said chroma and burst amplifier and said chroma channel, coupling means connected between the junction of said inductors and said burst channel, and a diode and a pulse source coupled in series between said chroma channel and said point of reference potential, said pulse source providing a pulse to render said diode conductive during retrace.

6. In a color television receiver, a chroma and burst amplifier coupled to a chroma channel and to a burst channel, comprising, a chroma and burst amplifier device having an output electrode, a first inductor having an input end coupled to said output electrode, a second inductor coupled from the other end of said first inductor to said chroma channel, first capacitance means connected between the input end of said first inductor and a point of reference potential for said receiver, said first inductor and said first capacitance means having values to provide series resonance at the frequency of said bursts, second capacitance means connected between the end of said second inductor nearest said chroma channel and said point of reference potential, said second capacitance inductor and second means having values in combination with said first capacitance inductor and first means to provide the desired frequency response characteristic to said chroma signal, coupling means connected between the junction of said inductors and said burst channel, and a diode and a pulse source coupled in series between said chroma channel and said point of reference potential, said pulse source providing a pulse to render said diode conducting during said bursts.

References Cited in the file of this patent

UNITED STATES PATENTS 2,743,311 Richman ------------- Apr. 24, 1956